(12) United States Patent
Zou

(10) Patent No.: US 12,195,226 B2
(45) Date of Patent: Jan. 14, 2025

(54) DOUBLE-LAYER DETACHABLE SLUSHY MAKER CUP WITH SEALING CONNECTION ASSEMBLY

(71) Applicant: Chunliang Zou, Guangdong (CN)

(72) Inventor: Chunliang Zou, Guangdong (CN)

( * ) Notice: Subject to any disclaimer, the term of this patent is extended or adjusted under 35 U.S.C. 154(b) by 291 days.

(21) Appl. No.: 17/948,365

(22) Filed: Sep. 20, 2022

(65) Prior Publication Data

US 2024/0092525 A1    Mar. 21, 2024

(51) Int. Cl.

| | |
|---|---|
| *B65D 81/38* | (2006.01) |
| *A23G 9/04* | (2006.01) |
| *A23G 9/26* | (2006.01) |
| *A47G 19/22* | (2006.01) |
| *A47J 41/00* | (2006.01) |
| *A47J 43/27* | (2006.01) |
| *B65D 1/26* | (2006.01) |
| *B65D 77/04* | (2006.01) |
| *F25D 31/00* | (2006.01) |

(52) U.S. Cl.
CPC .............. *B65D 1/26* (2013.01); *A23G 9/045* (2013.01); *A23G 9/26* (2013.01); *A47G 19/2288* (2013.01); *A47J 41/0044* (2013.01); *A47J 43/27* (2013.01); *B65D 77/0493* (2013.01); *B65D 81/3872* (2013.01); *F25D 31/002* (2013.01); *F25D 2303/0842* (2013.01)

(58) Field of Classification Search
CPC ................ F25D 31/002; F25D 31/007; F25D 2303/0841; F25D 2303/0842; B65D 11/16; B65D 77/0493; B65D 81/3865; B65D 81/3869; B65D 81/3872; B65D 81/3876; B65D 81/3881; B65D 81/3883; B65D 81/3837; B65D 81/3841; B65D 81/3844; A47J 41/00; A47J 41/0038; A47J 41/0044; A47J 41/0072; A47J 41/02; A47J 41/022
See application file for complete search history.

(56) References Cited

U.S. PATENT DOCUMENTS

| | | | |
|---|---|---|---|
| 3,715,895 A | 2/1973 | Devlin | |
| 4,528,824 A | 7/1985 | Herbert | |
| 5,361,604 A * | 11/1994 | Pier ................. | B65D 81/3883 62/530 |
| D386,360 S | 11/1997 | Krug, Sr. | |
| 6,050,443 A * | 4/2000 | Tung .................. | A47G 19/2227 220/62.12 |
| 6,739,475 B2 | 5/2004 | San Martin et al. | |
| 7,272,935 B1 | 9/2007 | Wolf | |

(Continued)

FOREIGN PATENT DOCUMENTS

WO   WO-2021123626 A1 *   6/2021   ............. A45D 34/00

*Primary Examiner* — Jerry-Daryl Fletcher
*Assistant Examiner* — Daniel C Comings

(57) ABSTRACT

A double-layer detachable slushy maker cup with sealing connection assembly has an inner core and an outer cup body. An upper portion of the inner core is limited and sleeved with a sealing connection assembly; a cup rim of the inner core is in sealed connection to an upper end opening of the sealing connection assembly; the outer cup body is provided with an inner retaining ring edge which is connected to an outer side of the sealing connection assembly in a sealed manner; the outer cup body and the inner core are sealed stably; a lower portion of the inner core is provided with a convex rib structure.

9 Claims, 15 Drawing Sheets

(56) References Cited

U.S. PATENT DOCUMENTS

| | | |
|---|---|---|
| 9,555,949 B1 * | 1/2017 | French .................... F25D 3/08 |
| 10,123,552 B2 | 11/2018 | Delle Coste et al. |
| 2007/0023448 A1 | 2/2007 | Kleinschrodt |
| 2007/0110855 A1 | 5/2007 | Mosey |
| 2008/0078200 A1 | 4/2008 | Roth et al. |
| 2009/0186133 A1 | 7/2009 | Bjork et al. |
| 2021/0113024 A1 | 4/2021 | Barrie |
| 2022/0022484 A1 | 1/2022 | Van Isacker et al. |
| 2024/0140676 A1 * | 5/2024 | Jouan .................... B65D 51/18 |

* cited by examiner

DOUBLE-LAYER DETACHABLE SLUSHY MAKER CUP WITH SEALING CONNECTION ASSEMBLY

FIELD OF TECHNOLOGY

The present invention relates to the field of slushy cups, and in particular to a detachable slushy maker cup.

BACKGROUND

A slushy cup is an instrument used for making smoothies. The wall of the cup is of a double-layer structure. A gap between an interlayer of an inner wall and an outer wall is filled with a refrigerating fluid, and the refrigerating fluid is sealed in the interlayer. After the slushy cup is put in a refrigerator for freezing treatment, a drink can be poured into the cup body and the smoothie can be made by means of shaking the cup body. However, a cup core and a cup shell of this type of slushy cup are of an integrated design, and therefore, it can easily slip out of a user's hands when making the smoothie shaking cup body, resulting in the cup body being scrapped and useless, and the internal refrigerating fluid is easy to leak out. There are slushy cups in the market that can be squeezed by hand. An outer cup body is made of a soft material, and a refrigeration bag is placed in the cup. The liquid in the cup is quickly cooled by means of the refrigeration bag to make ice. However, due to the soft packaging of this kind of refrigeration bag, the refrigeration fluid in the refrigeration bag is easy to mix with the drink, causing pollution to the drink. In addition, a cup rim is easy to deform in the process of squeezing, and the drink in the cup is easy to overflow of the cup rim.

SUMMARY

The objective of the present invention lies to provide a detachable slushy maker cup. An outer cup body and an inner core are made of soft materials, and the outer cup body and the inner core are connected by means of a hard sealing connection assembly, such that smoothie making by means of hand squeezing is realized, the outer cup body and the inner core are sealed stably, and the phenomenon of deformation of a cup rim in the hand kneading process will not occur.

In order to achieve the above-mentioned objective, the present invention provides the following technical solutions: a detachable slushy maker cup, comprising an outer cup body and an inner core, a lower core body of the inner core is placed inside the outer cup body, the core body of the inner core is used for containing drinks to be cooled, an interlayer formed between an inner wall of the outer cup body and an outer wall of the inner core is used for containing an accommodation space of a refrigerating fluid, and a sealing connection assembly is sheathed between an upper core body of the inner core and the top of the outer cup body; wherein the sealing connection assembly comprises a connection main body, an upper end opening of the top of the connection main body is formed with an upper ring edge which extending inwards and upwards, an outer wall of the opening of the inner core extends outwards and downwards to form an annular inner core outer edge, the inner core outer edge and the outer wall of the inner core form a first annular groove, the upper ring edge is in interference fit and sealed connection to the first annular groove; a lower outer wall of the connection main body is formed with a flared ring edge extending outwards and upwards, wherein the flared ring edge and the connection main body form a third annular groove, an inner side of a top edge of the outer cup body is formed with an inner retaining ring edge, the inner retaining ring edge and the outer cup body are provided with a fourth annular groove, the flared ring edge enters the inside of the outer cup body from a top opening of the outer cup body and is in interference fit and sealed connection to the fourth annular groove, the inner retaining ring edge is in interference fit and sealed connection to the third annular groove, and the sealing connection assembly is in limited sealing connection to the outer cup body and the inner core respectively.

By using the above-mentioned technical solutions, a sealed connection between the connection main body and the inner core is realized; when the outer cup body is squeezed manually, silica gel materials of the outer cup body and the inner core, the outer cup body and the inner core are respectively sealed into different spaces by means of the sealing connection assembly, and the refrigerating fluid in the outer cup body is squeezed, such that the drinks in the inner core exchanges cold and heat with the refrigerating fluid in the outer cup body, and the temperature of the drinks in the inner core drops sharply, such that the refrigerating fluid in the outer cup body can be prevented from flowing out into the drinks in the inner core body, and the drinks can be prevented from being polluted.

Further, a bottom surface of the connection main body is circumferentially provided with a bottom circumferential ring edge, the outer wall of the inner core is circumferentially provided with an extension portion extending outwards, an upper surface of the extension portion is provided with a second annular groove, and the bottom circumferential ring edge is in interference fit and sealed connection to the second annular groove.

By using the above-mentioned technical solutions, the connection main body and the extension portion of the inner core form mutually sealed connection, so as to prevent the refrigerating fluid in the outer cup body from flowing into the inner core. Further, the sealing connection assembly further comprises a sealing shell, wherein the sealing shell is provided with an internal thread, the connection main body is provided with an external thread, the connection main body and the sealing shell are screwed and fixedly connected to the external thread by means of the internal thread.

By using the above-mentioned technical solutions, the connection main body and the inner core are connected more closely by means of the threaded connection between the sealing shell and the connection main body, and the sealing shell is compressed on an outer edge of the outer cup body, and the connection main body is connected to the inner core and the outer cup body in a limited manner.

Further, an upper surface of the flared ring edge is provided with a plurality of limiting protruding blocks arranged at equal angular intervals, an upper surface of the inner retaining ring edge is provided with limiting through holes matched with the limiting protruding blocks, the limiting through holes are communicated with the fourth annular groove.

By using the above-mentioned technical solutions, the limiting protruding blocks are inserted into the limiting through holes to limit the rotation of the outer cup body and the connection main body and prevent the outer cup body from being pulled out of the sealing connection assembly.

Further, the bottom of the inner core is a spherical cup bottom, and an included angle of a joint between the spherical cup bottom and a cup wall of the inner core is greater than 90 degrees.

By using the above-mentioned technical solutions, the spherical cup bottom at the bottom of the inner core increases the capacity of the inner core to contain drinks; meanwhile, when the bottom of the inner core cup is cleaned, a contact position between the cup bottom and the inner cup wall and the cleaning brush is larger, such that it is easier to clean.

Further, an inner flaring edge extends inward from the upper end opening of the sealing shell, and when the sealing shell is screwed with the connection main body installed on the inner core, the inner core outer edge of the inner core is pressed against the inner side of the inner flaring edge.

By using the above-mentioned technical solutions, the inner flaring edge abuts against the inner core outer edge during installation, which effectively prevents the drinks in the inner core from being squeezed and overflowing, the sealing shell compresses the gap between the connection main body and the outer cup body, and the drinks is prevented from contacting with the refrigerating fluid. Further, the outer wall of the inner core located below the extension portion is provided with a convex rib structure, wherein the convex rib structure comprises grid convex ribs circumferentially arranged along the outer wall of the inner core.

By using the above-mentioned technical solutions, the grid convex ribs increase the contact area between the inner core and the refrigerating fluid, and at the same time, enhance the overall support strength of the inner core, so as to avoid the inner core from being damaged in the process of extruding smoothies.

Further, the convex rib structure further comprises four radial convex ribs arranged outside the grid convex ribs and axially and fixedly connected to an outer peripheral side wall of the inner core, and the four radial convex ribs are evenly distributed in the circumferential direction of the outer peripheral side wall of the inner core.

By using the above-mentioned technical solutions, the strength of the convex rib structure is stronger, the convex rib structure is solid conduction, has fast conduction speed, and simultaneously increases the strength of the inner core.

Further, the convex rib structure further comprises three radial annular convex ribs fixedly connected to the peripheral side wall of the inner core circumferentially, the three radial annular convex ribs are axially distributed along the peripheral side wall of the inner core, the distance between the three radial annular convex ribs is the same, and the radial convex ribs are vertically crossed with the radial annular convex ribs.

Further, an outer shape of the outer cup body is the trunk shape of a male or female human body or the hip shape of a human body.

According to the analysis, the present invention discloses a detachable slushy maker cup, wherein an inner core of a soft body and the outer cup body are sealed connection by means of a hard sealing connection assembly, such that the cup rim will not be deformed when the user squeezes the smoothie, thus preventing the internal liquid from spilling out from the cup rim; the cup rim of the inner core is provided with the inner core outer edge, and the extension portion is arranged below, so as to facilitate the limited connection of the sealing connection assembly; two ends of the connection main body of the sealing connection assembly are provided with an upper ring edge and a lower edge, which are respectively clamped with the first annular groove and the second annular groove of the inner core, thus realizing the sealed connection between the connection main body and the inner core; the flared ring edge of the connection main body is provided with a third annular groove, which is matched with the inner retaining ring edge of the outer cup body, and the limiting protruding blocks are matched with the limiting through holes to realize the limiting clamping between the outer cup body and the connection main body; meanwhile, the inner retaining ring edge is compressed by the screwing connection between the sealing shell and the connection main body to realize the sealed connection between the outer cup body and the sealing connection assembly, such that the refrigerating fluid is sealed between the interlayer between the inner core and the outer cup body; the convex rib structure is arranged on the outer side of the inner core, which increases the contact area between the inner core and the refrigerating fluid, enhances the overall support strength of the inner core, and avoids the inner core from being easily damaged when squeezing smoothie.

BRIEF DESCRIPTION OF THE DRAWINGS

The drawings of the specification which form a part of the present application are used to provide a further understanding of the present invention. The illustrative embodiments of the present invention and the explanation thereof are used to explain the present invention, and do not constitute undue limitations on the present invention, wherein.

Figure 1:
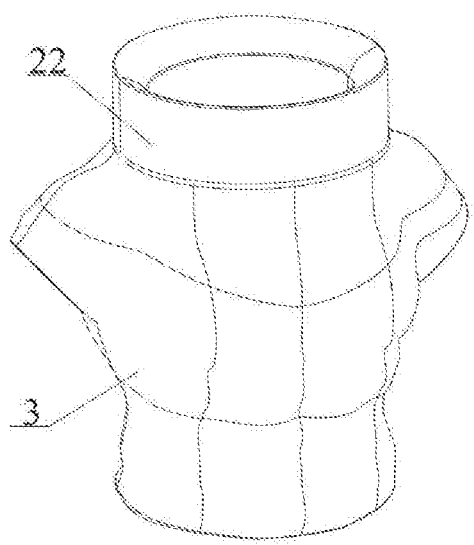
FIG. 1 is a structural schematic diagram of a detachable slushy maker cup in an embodiment of the present invention.
Figure 2:
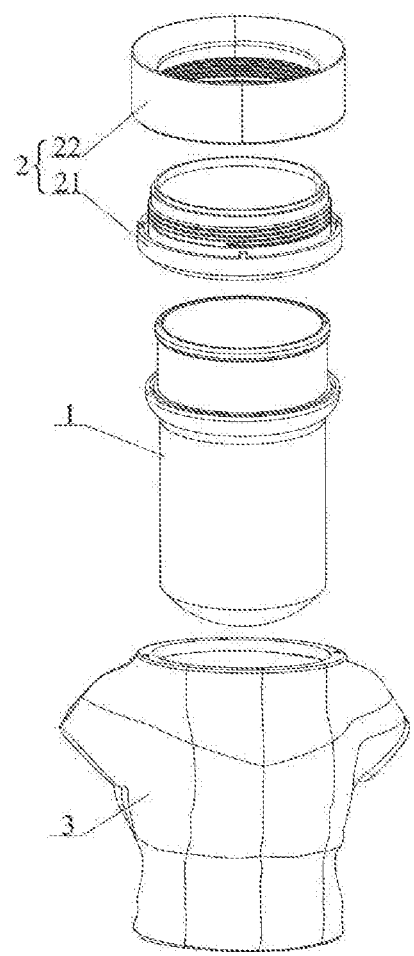
FIG. 2 is a schematic diagram of the explosion structure of a detachable slushy maker cup in an embodiment of the present invention.
Figure 3:
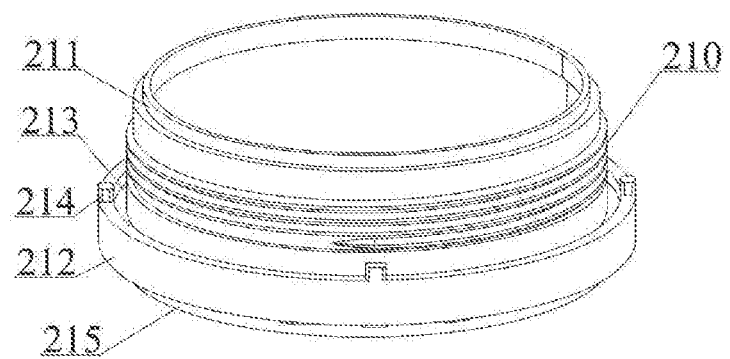
FIG. 3 is a schematic diagram of the stereoscopic structure of a connection main body of a detachable slushy maker cup in an embodiment of the present invention.
Figure 4:
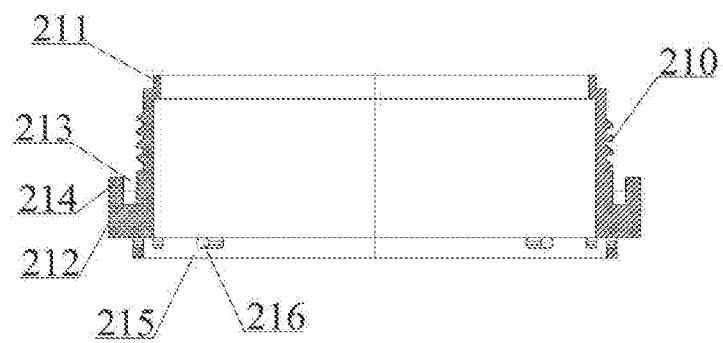
FIG. 4 is a schematic diagram of the cross-sectional structure of a connection main body of a detachable slushy maker cup in an embodiment of the present invention.
Figure 5:
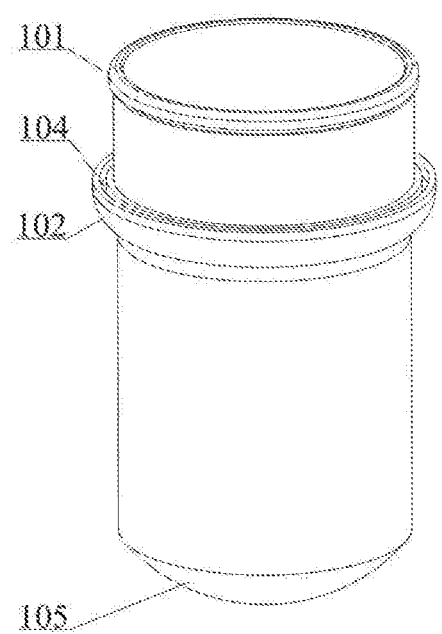
FIG. 5 is a schematic diagram of the stereoscopic structure of an inner core of a detachable slushy maker cup in an embodiment of the present invention.
Figure 6:
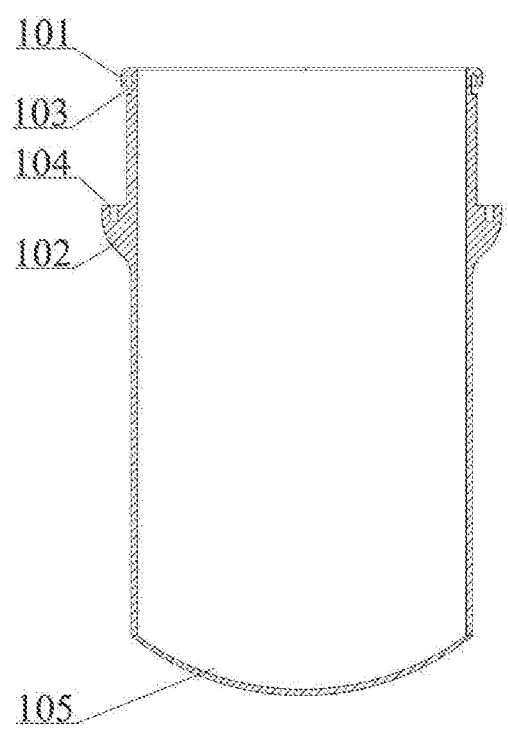
FIG. 6 is a schematic diagram of the cross-sectional structure of an inner core of a detachable slushy maker cup in an embodiment of the present invention.
Figure 7:
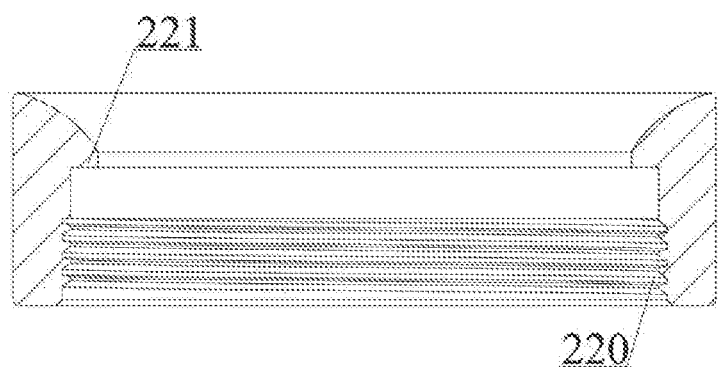
FIG. 7 is a schematic diagram of the cross-sectional structure of a sealing shell of a detachable slushy maker cup in an embodiment of the present invention.
Figure 8:
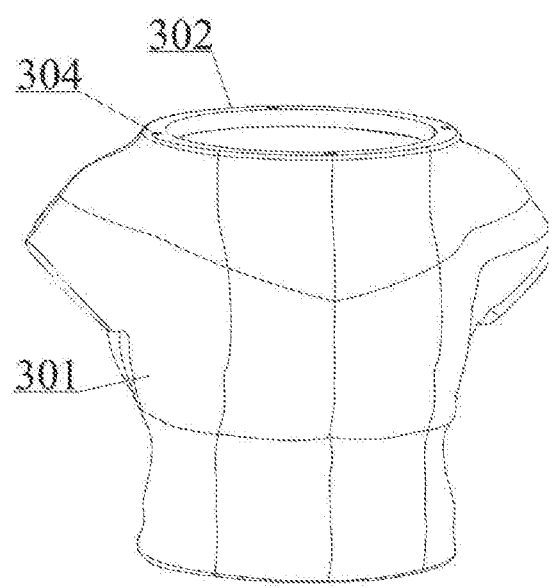
FIG. 8 is a schematic diagram of the stereoscopic structure of a first outer cup body of a detachable slushy maker cup in an embodiment of the present invention.
Figure 9:
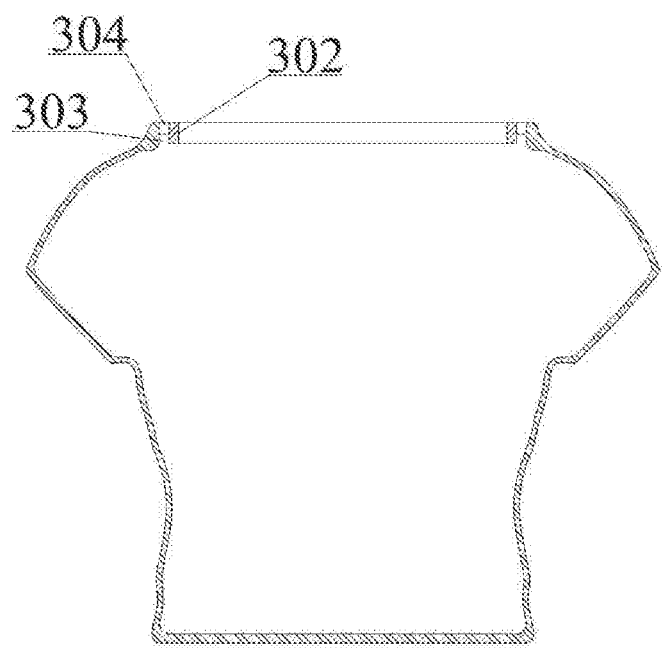
FIG. 9 is a schematic diagram of the cross-sectional structure of a first outer cup body of a detachable slushy maker cup in an embodiment of the present invention.
Figure 10:
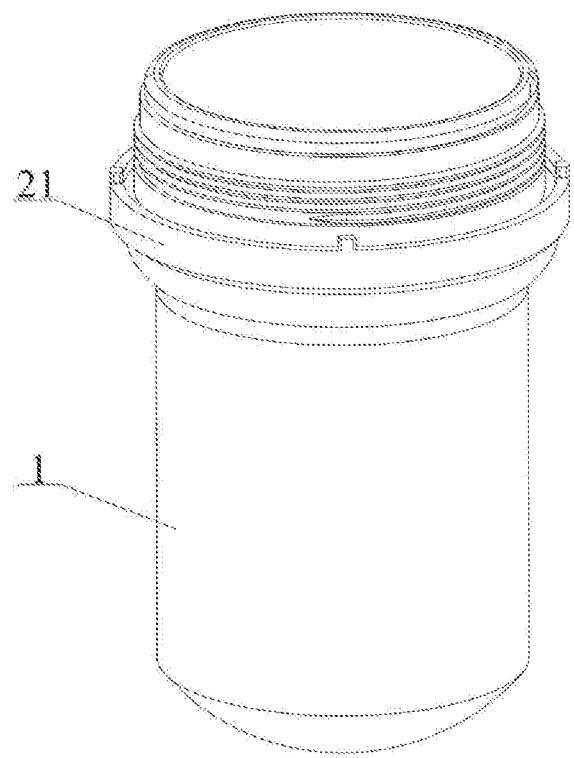
FIG. 10 is a structural schematic diagram of a connection main body of a detachable slushy maker cup in an embodiment of the present invention.
Figure 11:
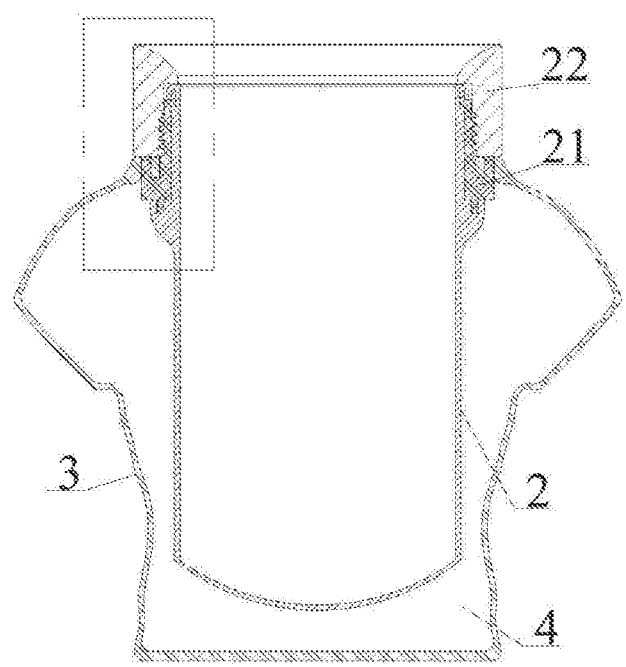
FIG. 11 is a schematic diagram of the cross-sectional structure of a detachable slushy maker cup in an embodiment of the present invention.
Figure 12:
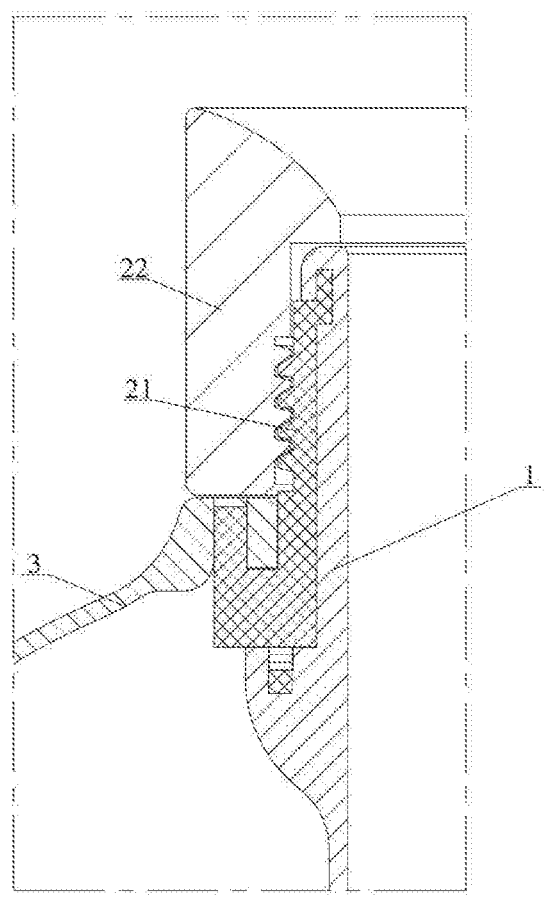
FIG. 12 is a partial schematic exploded view of the area marked by dotted lines in FIG. 11.

The description of reference signs: 1—inner core; 2—sealing connection assembly; 3—outer cup body; 21—connection main body; 22—sealing shell; 101—inner core outer edge; 102—extension portion; 103—first annular groove; 104—second annular groove; 105—spherical cup bottom; 106—grid convex rib; 107—radial convex rib; 108—annular convex rib; 210—external thread; 211—upper ring edge; 212—flared ring edge; 213—third annular groove; 214—limiting protruding block; 215—bottom circumferential ring edge; 216—through hole; 220—internal thread; 221—inner flaring edge; 301—cup body portion; 302—inner retaining ring edge; 303—fourth annular groove; 304—limiting through hole.

DETAILED DESCRIPTION OF THE EMBODIMENTS

Hereinafter, the present invention will be described in detail with reference to the drawings in combination with embodiments. Each example is provided by way of explanation of the present invention, but does not limit the present invention. Actually, it will be clear to those skilled in the art that modifications and variations can be made in the present invention without departing from the scope or spirit of the present invention. For example, features shown or described as part of one embodiment can be used in another embodiment to produce yet another embodiment. Therefore, it is intended that the present invention include such modifications and variations as come within the scope of the appended claims and their equivalents.

In the description of the present invention, terms such as "longitudinal", "traverse", "upper", "lower", "front", "rear", "left", "right", "vertical", "horizontal", "top", "bottom", are based on orientation or position relationships shown in the drawings, are merely to facilitate the description of the present invention and simplify the description, instead of requiring the present invention must be constructed and operated in particular orientations, and cannot be construed as limiting the present invention. Terms such as "connected", "connection" and "set" used in the present invention should be understood in broad sense, for example, can be fixed connection or detachable connection; can be directly connected or indirectly connected by means of an intermediate component; can be a wired electrical connection, a radio connection, or a wireless communication signal connection. For a person of ordinary skill in the art, the specific meanings of the above terms can be understood according to specific situations.

One or more examples of the present invention are shown in the attached drawings. The detailed description uses numeric and letter references to refer to the features in the drawings. Similar or analogous references in the drawings and descriptions have been used to refer to similar or references parts of the present invention. As used herein, terms such as "first", "second" and "third" are used interchangeably to distinguish one member from another, and are not intended to indicate the position or importance of individual member.

As shown in FIGS. 1 to 15, according to the embodiment of the present invention, a detachable slushy maker cup is provided, comprising an inner core 1, an upper portion of the inner core 1 is sheathed with a sealing connection assembly 2, the inner core 1 is in limited sealing connection with the sealing connection assembly 2, a lower portion of the inner core 1 extends into inside of an outer cup body 3, a cup rim of the outer cup body 3 is connected and sealed connection by means of the sealing connection assembly 2, and the sealing connection assembly 2 is sealed connection to the cup rim of the outer cup body 3. The inner core 1 and the outer cup 3 are made of soft materials, for example, a colloidal silica body, and the sealing connection assembly 2 is made of a hard material, such as a hard plastic. The inner core 1 is used for containing liquids such as drinks, and an interlayer 4 is formed between the outside of the inner core 1 and an inner side of the outer cup body 3 for containing a refrigerating fluid.

The opening of the inner core 1 is provided with an inner core outer edge 101 extending outward and downward, an outer surface of the inner core 1 located below the inner core outer edge 101 is provided an extension portion 102 extending outward, and an installation space of the sealing connection assembly 2 is formed between the inner core outer edge 101 and the extension portion 102. An inner side of the inner core outer edge 101 located on an outer side of an outer wall of the inner core is provided with a first annular groove 103, and a second annular groove 104 is arranged on an upper surface of the extension portion 102, which is used for sealed connecting the sealing connection assembly 2 and the inner core 1. The bottom of the inner core 1 is provided with a spherical cup bottom 105, the angle of a joint between the spherical cup bottom 105 and the side wall of the inner core 1 is greater than 90, which is convenient to clean and effectively cleans less dead angles.

The sealing connection assembly 2 comprises a connection main body 21, and a sealing shell 22 is screwed connected to the outside of the connection main body 21. The connection main body 21 is of a hollow annular structure, an outer wall of the connection main body 21 is circumferentially provided with external thread 210, an upper ring edge 211 arranged inwards and upward at an upper end opening of the connection main body 21, the outer diameter of the upper ring edge 211 is smaller than the inner diameter of the external thread 210, and the shape and size of the upper ring edge 211 are matched with the first annular groove 103. A lower outer wall of the connection main body 21 is formed with a flared ring edge 212 extending outwards and upwards, wherein the outer diameter of the flared ring edge 212 is larger than the outer diameter of the external thread 210, a third annular groove 213 is provided between the flared ring edge 212 and the connection main body 21, and an upper surface of the flared ring edge 212 is provided with four limiting protruding blocks 214 arranged at equal angular intervals; the bottom of the connection main body 21 is provided with a bottom circumferential ring edge 215, the shape and size of the bottom circumferential ring edge 215 are matched with the second annular groove 104, and the bottom circumferential ring edge 215 is provided with a plurality of positioning holes 216 along the circumferential direction. Correspondingly, one side, closes to the inner core cup body, of an inner side of the second annular groove 104 is provided with a plurality of positioning keys corresponding to the positioning holes 216. When the bottom circumferential ring edge 215 is installed in the second annular groove 104, the plurality of positioning keys pass through the corresponding positioning holes 216, further sealed connection between the bottom circumferential ring edge 215 and the second annular groove 104 is realized, and the relative rotation of the connection main body 21 and the inner core 1 is restricted. When the sealing connection assembly 2 is sealed connection to the inner core 1, the upper ring edge 211 of the upper end opening of the connection main body 21 is installed in the first annular groove 103, and the bottom circumferential ring edge 215 at the bottom of the connection main body 21 is installed in the second annular groove 104 of the inner core 1. The sealing shell 22 is of a hollow circular structure, an inner side wall of the sealing shell 22 is provided with an internal thread 220, and the internal thread 220 is matched with the external thread 210 on an outer side of connection main body 21; an inner flaring edge 221 extends inward from an upper end opening of the sealing shell 22. When the sealing shell 22 is screwed with the connection main body 21 installed on the inner core 1, the inner core outer edge 101 of the inner core 1 is pressed against an inner side of the inner flaring edge 221 to prevent the drinks in the cup core from entering the interlayer.

The outer cup body 3 is made of the soft material, and comprises a cup body portion 301. An opening above the cup body portion 301 is inwardly provided with an inner retaining ring edge 302, and an inner surface of the inner retaining ring edge 302 is provided with a fourth annular groove 303. An outer surface of the inner retaining ring edge 302 is provided with four limiting through holes 304 at equal angular intervals along the circumferential direction, and the limiting through holes 304 are communicated with the fourth annular groove 303. The size of the limiting through holes 304 are matched with the limiting protruding blocks 214 on the connection main body 21. When the outer cup body 3 is installed, the edge of the inner retaining ring edge 302 of the outer cup body 3 is installed inside the third annular groove 213 of the connection main body 21, the edge of the flared ring edge 212 of the connection main body 21 is clamped inside the fourth annular groove 303 of the cup rim of the outer cup body 3, and the outer cup body 3 is supported at the cup rim, and the limiting protruding blocks 214 of the connection main body 21 are installed in the limiting through holes 304. It is possible to prevent the outer cup body 3 from being torn apart during the squeezing process, and place the sealing shell 22 from above the connection main body 21 and screwed to compress the inner retaining ring edge 302 of the outer cup body 3, so as to realize the limited sealed connection between the outer cup body 3 and the sealing connection assembly 2 and prevent the interlayer refrigerating fluid from overflowing.

Figure 13:
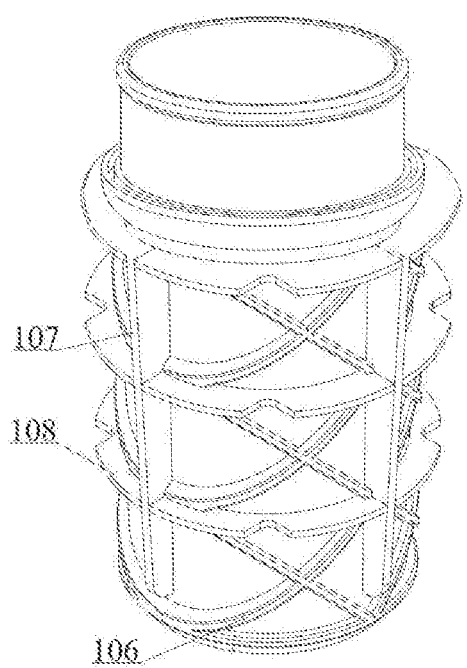
FIG. 13 is a structural schematic diagram of an inner core structure with a convex rib construction in an embodiment of the present invention.
Figure 14:
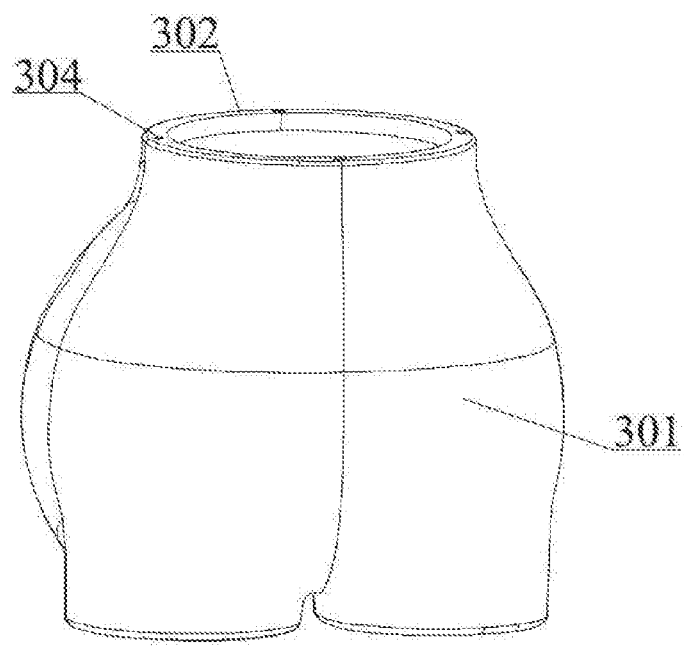
FIG. 14 is a schematic diagram of the stereoscopic structure of the second outer cup body of the detachable slushy maker cup of the present invention.
Figure 15:
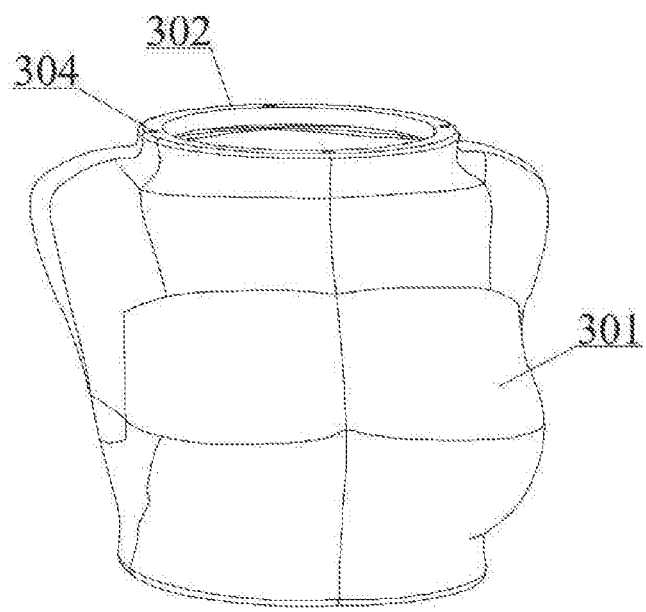
FIG. 15 is a schematic diagram of the stereoscopic structure of the third outer cup body of the detachable slushy maker cup of the present invention.

Preferably, as shown in FIG. 13, the outer wall of the inner core 1 located below the extension portion 102 is provided with a convex rib structure, wherein the convex rib structure comprises grid convex ribs 106 circumferentially arranged along the outer wall of the inner core 1, four radial convex ribs 107 arranged outside the grid convex ribs 106 and axially and fixedly connected to an outer peripheral side wall of the inner core 1, and the four radial convex ribs 107 are evenly distributed in the circumferential direction of the outer peripheral side wall of the inner core 1. The convex rib structure further comprises three radial annular convex ribs 108 fixedly connected to the peripheral side wall of the inner core 1 circumferentially, the three radial annular convex ribs 108 are axially distributed along the peripheral side wall of the inner core 1, the distance between the three radial annular convex ribs 108 is the same, and the radial convex ribs 107 are vertically crossed with the radial annular convex ribs 108, which increases the contact area between the inner core and the refrigerating fluid, and at the same time enhances the overall support strength of the inner core 1.

First, make a 20% brine refrigerating fluid. According to the actual volume of the outer cup body 3, 40 g of sodium chloride can be put into the outer cup body 3, and then 200 ml of water is added into the outer cup body 3. After the sodium chloride is dissolved, the brine refrigerating fluid is formed. After the connection main body 21 is assembled and connected to the inner core 1, same is put into the outer cup body 3 filled with saline refrigerating fluid, the connection main body 21 and the sealing shell 22 are screwed and tightened, such that the cup body of the complete slushy cup is assembled and molded; put the whole assembled slushy cup into the refrigerator and freeze for 3-6 hours. After freezing, pour cold drinks or non-frozen drinks into the frozen inner core 1, repeatedly squeeze the outer cup body 3 and the inner core 1 of the cup, and squeeze for 1-2 minutes to make the drinks in the inner core 1 into smoothies.

From the above description, it can be seen that the above-mentioned embodiments of the present invention achieve the following technical effects:

1. the soft inner core 1 and the outer cup body 3 are sealed connection by means of a hard sealing connection assembly 2, such that the cup rim will not be deformed when the user squeezes the smoothie, thus preventing the internal liquid from spilling out from the cup rim.
2. The cup rim of the inner core 1 is provided with the inner core outer edge 101, and an extension portion 102 is arranged below, so as to facilitate the limited connection of the sealing connection assembly 2.
3. two ends of the connection main body 21 of the sealing connection assembly 2 are provided with the upper ring edge 211 and the bottom circumferential ring edge 215, which are respectively clamped with the first annular groove 103 and the second annular groove 104 of the inner core 1, thus realizing the sealed connection between the connection main body 21 and the inner core 1.
4. The flared ring edge 212 of the connection main body 21 is provided with the third annular groove 213, which is matched with the inner retaining ring edge 302 of the outer cup body 3, and the limiting protruding blocks 214 are matched with the limiting through holes 304 to realize the limiting clamping between the outer cup body 3 and the connection main body 21. At the same time, the inner retaining ring edge 302 is compressed by means of the screwing connection between the sealing shell 22 and the connection main body 21, so as to realize the sealed connection between the outer cup body 3 and the sealing connection assembly 2, and thus the refrigerating fluid is sealed between the interlayer 4 between the inner core 1 and the outer cup body 3.
5. The convex rib structure is arranged on the outside of the inner core 1, which increases the contact area between the inner core and the refrigerating fluid, and at the same time, enhances the overall support strength of the inner core 1, and prevents the inner core 1 from being easily damaged when squeezing smoothies.
6. By means of splitting the detachable slushy maker cup, the outer cup body with different shapes can be replaced, and the outer cup body can be the shape of the trunk or the hip of a human body, such that users have more choices and increase the fun in the smoothie making process.

Compared with the prior art, the detachable slushy maker cup of the present invention has a safer and more reliable structure when making smoothies, and the cup body is convenient to disassemble and wash; meanwhile, the detachable slushy maker cup is provided with a plurality of replaceable outer cup bodies, such that more choices are provided for users.

The foregoing descriptions are merely preferred embodiments of the present invention, but are not intended to limit the present invention, which may be subject to various modifications and variations to a person skilled in the art. Any modification, equivalent replacement, improvement, or the like made within the spirit and principle of the present invention should fall within the protection scope of the present invention.

The invention claimed is:

1. A detachable slushy maker cup, comprising an outer cup body and an inner core, wherein a lower core body of the inner core is placed inside the outer cup body, a core body of the inner core is used for containing drinks to be cooled, an interlayer formed between an inner wall of the outer cup body and an outer wall of the inner core is used for containing an accommodation space filled with a refrigerating fluid, and a sealing connection assembly is sheathed between an upper core body of the inner core and a top of the outer cup body,
wherein the sealing connection assembly comprises a connection main body, an upper end opening of a top of the connection main body is formed with an upper ring edge extending inwards and upwards, an outer wall of an opening of the inner core extends outwards and downwards to form an annular inner core outer edge, the annular inner core outer edge and the outer wall of the inner core form a first annular groove, the upper ring edge is in interference fit and sealed connection to the first annular groove;
a lower outer wall of the connection main body is formed with a flared ring edge extending outwards and upwards, wherein the flared ring edge and the connection main body form a third annular groove, an inner side of a top edge of the outer cup body is formed with an inner retaining ring edge, the inner retaining ring edge and the outer cup body are provided with a fourth annular groove, the flared ring edge enters an inside of the outer cup body from a top opening of the outer cup body and is in interference fit and sealed connection to the fourth annular groove, the inner retaining ring edge is in interference fit and sealed connection to the third annular groove, and the sealing connection assembly in sealed connection to the outer cup body and the inner core respectively.

2. The detachable slushy maker cup of claim 1, wherein a bottom surface of the connection main body is circumferentially provided with a bottom circumferential ring edge, the outer wall of the inner core is circumferentially provided with an extension portion extending outwards, an upper surface of the extension portion is provided with a second annular groove, and the bottom circumferential ring edge is in interference fit and sealed connection to the second annular groove.

3. The detachable slushy maker cup of claim 2, wherein the sealing connection assembly further comprises a sealing shell, the sealing shell is provided with an internal thread, the connection main body is provided with an external thread, the connection main body and the sealing shell are screwed and fixedly connected to the external thread by means of the internal thread, and a bottom end of the sealing shell compresses the inner retaining ring edge of the outer cup body.

4. The detachable slushy maker cup of claim 3, wherein an upper surface of the flared ring edge is provided with a plurality of limiting protruding blocks arranged at equal angular intervals, an upper surface of the inner retaining ring edge is provided with limiting through holes matched with the limiting protruding blocks, the limiting through holes are communicated with the fourth annular groove, the limiting protruding blocks are inserted into the limiting through holes to limit the rotation of the outer cup body and the connection main body.

5. The detachable slushy maker cup of claim 4, wherein the bottom of the inner core is a spherical cup bottom, and an included angle of a joint between the spherical cup bottom and a cup wall of the inner core is greater than 90 degrees.

6. The detachable slushy maker cup of claim 4, wherein an inner flaring edge extends inward from the upper end opening of the sealing shell, and when the sealing shell is screwed with the connection main body installed on the inner core, the inner core outer edge is pressed against the inner side of the inner flaring edge.

7. The detachable slushy maker cup of claim 4, wherein the outer wall of the inner core located below the extension portion is provided with a convex rib structure, wherein the convex rib structure comprises grid convex ribs circumferentially arranged along the outer wall of the inner core.

8. The detachable slushy maker cup of claim 7, wherein the convex rib structure further comprises four radial convex ribs arranged outside the grid convex ribs and axially and fixedly connected to an outer peripheral side wall of the inner core, and the four radial convex ribs are evenly distributed in the circumferential direction of the outer peripheral side wall of the inner core.

9. The detachable slushy maker cup of claim 8, wherein the convex rib structure further comprises three radial annular convex ribs fixedly connected to the outer peripheral side wall of the inner core circumferentially, the three radial annular convex ribs are axially distributed along the outer peripheral side wall of the inner core, the distance between the three radial annular convex ribs is the same, and the radial convex ribs are vertically crossed with the radial annular convex ribs.

* * * * *